(12) United States Patent
Yousfi

(10) Patent No.: US 10,721,360 B2
(45) Date of Patent: Jul. 21, 2020

(54) METHOD AND DEVICE FOR REDUCING TELEPHONE CALL COSTS

(71) Applicant: Idriss Yousfi, Montreal (CA)

(72) Inventor: Idriss Yousfi, Montreal (CA)

( * ) Notice: Subject to any disclaimer, the term of this patent is extended or adjusted under 35 U.S.C. 154(b) by 149 days.

(21) Appl. No.: 16/162,537

(22) Filed: Oct. 17, 2018

(65) Prior Publication Data

US 2019/0124204 A1 Apr. 25, 2019

Related U.S. Application Data

(60) Provisional application No. 62/576,729, filed on Oct. 25, 2017.

(51) Int. Cl.
*H04M 7/00* (2006.01)
*H04L 29/06* (2006.01)
*H04M 3/42* (2006.01)
*H04M 7/12* (2006.01)

(52) U.S. Cl.
CPC ........ *H04M 7/0066* (2013.01); *H04L 65/103* (2013.01); *H04L 65/104* (2013.01); *H04L 65/1069* (2013.01); *H04M 3/42221* (2013.01); *H04M 7/125* (2013.01); *H04M 7/1245* (2013.01)

(58) Field of Classification Search
CPC ............ H04M 7/0066; H04M 3/42221; H04L 65/103; H04L 65/104; H04L 65/1069
See application file for complete search history.

(56) References Cited

U.S. PATENT DOCUMENTS

| 3,992,583 | A | * | 11/1976 | Davis | H04M 1/2155 379/443 |
| 4,005,269 | A | * | 1/1977 | Willis | H04M 1/2155 455/561 |
| 4,782,527 | A | * | 11/1988 | Williamson | H04M 1/03 379/430 |
| 10,356,232 | B1 | * | 7/2019 | Nalakath | H04R 1/1091 |
| 2002/0061111 | A1 | * | 5/2002 | Kulas | G06F 16/94 381/89 |
| 2019/0191237 | A1 | * | 6/2019 | Wang | G10K 11/178 |

FOREIGN PATENT DOCUMENTS

EP 1001597 5/2000

* cited by examiner

*Primary Examiner* — Simon King
(74) *Attorney, Agent, or Firm* — Benoit & Cote Inc.; Charles-Andre Caron

(57) ABSTRACT

There is described a gateway system comprising: a local-call device for receiving and sending phone call signals from and to a telephone device located in a same telecommunication zone; a VoIP device, distinct from the local-call device, for receiving and sending VoIP call signals from and to a remote and distinct VoIP device located in another distinct telecommunication zone; and a voice transmission apparatus comprises a set of two acoustically distinct chambers. Those comprise a first chamber comprising a first microphone and a second speaker; and a second chamber comprising a second microphone and a first speaker. The first microphone and the first speaker are in communication with the local-call device only and the second microphone and the second speaker are in communication with the VoIP device of the gateway system only.

20 Claims, 5 Drawing Sheets

METHOD AND DEVICE FOR REDUCING TELEPHONE CALL COSTS

CROSS-REFERENCE TO RELATED APPLICATIONS

This application claims benefit or priority of U.S. provisional patent application 62/576,729, filed Oct. 25, 2017, which is hereby incorporated herein by reference in its entirety.

BACKGROUND

(a) Field

The subject matter disclosed generally relates to methods, devices and systems for reducing telephone call costs. More specifically, it relates to a device for interfacing traditional phone calls with VoIP calling systems.

(b) Related Prior Art

There exists several systems and methods in the field of telephony for making telephone calls at lower cost, notably international calls.

There also exists systems and methods for making conference between phone calls, such as fixed or mobile, and VoIP calls.

For example, EP1001597 (Yoav) discloses a method and system for reducing an overall per unit cost of telephone calls directed by a subscriber to a receiving party. A low-cost data communications line, such as the Internet, is provided in parallel with a public telephone network, and the telephone call is routed through whichever of the data communications line and the telephone network is less expensive.

However, known systems and methods for reducing telephone costs are complex and relatively expensive to implement.

There is therefore a need for an improved system and method for reducing telephone costs that are less complex and relatively inexpensive to implement compared to the known systems and methods.

SUMMARY

According to an aspect of the invention, there is provided a method for making a call between a first telephone device and a second telephone device located in different telecommunication zones, namely a first zone and a second zone respectively, the method comprising:
  calling, by the first telephone device, a first gateway located in the first zone, and transmitting a first voice signal thereto;
  at the first gateway, emitting the first voice signal in a first acoustic environment of the first gateway;
  at the first gateway, recording the first voice signal as emitted;
  establishing a VoIP call session between the first gateway and a second gateway located in the second zone distinct from the first zone;
  sending, by the first gateway, the first voice signal as recorded to the second gateway;
  at the second gateway, receiving and emitting the first voice signal in a first acoustic environment of the second gateway;
  at the second gateway, recording the first voice signal as emitted; and
  by the second gateway, establishing a telephone call session with the second telephone device, also located in the second zone, and transmitting the first voice signal, as recorded at the second gateway, thereto.

According to an embodiment, the steps of:
  emitting the first voice signal in a first acoustic environment of the first gateway; and
  emitting the first voice signal in a first acoustic environment of the second gateway;
are each performed by a respective speaker dedicated to this step.

According to an embodiment, each respective speaker has a corresponding microphone for recording the first voice signal as emitted by each respective speaker.

According to an embodiment, there are further provided the steps of:
  by the second gateway, receiving a second voice signal from the second telephone device;
  at the second gateway, emitting the second voice signal in a second acoustic environment of the second gateway acoustically distinct from the first acoustic environment thereof;
  at the second gateway, recording the second voice signal as emitted;
  sending, by the second gateway, the second voice signal as recorded to the first gateway on the VoIP call session;
  at the first gateway, receiving and emitting the second voice signal in a second acoustic environment of the first gateway acoustically distinct from the first acoustic environment thereof;
  at the first gateway, recording the second voice signal as emitted; and
  by the first gateway, transmitting the second voice signal, as recorded at the second gateway, to the first telephone device.

According to an embodiment, the steps of:
  emitting the first voice signal in a first acoustic environment of the first gateway; and
  emitting the first voice signal in a first acoustic environment of the second gateway;
  emitting the second voice signal in a second acoustic environment of the second gateway;
  emitting the second voice signal in a second acoustic environment of the first gateway;
are each performed by a respective speaker dedicated to this step.

According to an embodiment, each respective speaker has a corresponding microphone for recording the first voice signal as emitted by each respective speaker.

According to an embodiment, calling, by the first telephone device, a first gateway located in the first zone comprises calling over a telephone network only within the first zone.

According to an embodiment, establishing a telephone call session with the second telephone device, by the second gateway, comprises calling over a telephone network only within the second zone.

According to another aspect of the invention, there is provided a gateway system comprising:
  a local-call device for receiving and sending phone call signals from and to a telephone device located in a same telecommunication zone;
  a VoIP device, distinct from the local-call device, for receiving and sending VoIP call signals from and to a remote and distinct VoIP device located in another distinct telecommunication zone;

a voice transmission apparatus comprises a set of two acoustically distinct chambers comprising:
- a first chamber comprising a first microphone and a second speaker; and
- a second chamber comprising a second microphone and a first speaker;

wherein the first microphone and the first speaker are in communication with the local-call device only and the second microphone and the second speaker are in communication with the VoIP device of the gateway system only.

According to an embodiment, the first microphone and the first speaker are in connection with a first connector that connects to the local-call device only and the second microphone and the second speaker are in connection with a second connector that connects to the VoIP device of the gateway system only.

According to an embodiment, the first connector and the second connector comprise a jack connector.

According to an embodiment, the first connector and the second connector comprise a Bluetooth™ connector.

According to an embodiment, the local-call device is a telephone.

According to an embodiment, the local-call device is for receiving and sending phone call signals over a telephone network.

According to an embodiment, the local-call device is for receiving and sending phone call signals over internet.

According to an embodiment, the voice transmission apparatus comprises a body that defined the set of two acoustically distinct chambers, the body being made of a material that provides acoustic insulation.

According to an embodiment, the remote and distinct VoIP device located in another distinct telecommunication zone belongs to another gateway system thus forming a pair of gateway systems performing a VoIP gateway being telecommunication zones.

According to another aspect of the invention, there is provided a voice transmission apparatus comprising:
- a body defining a set of two acoustically distinct chambers comprising:
  - a first chamber comprising a first microphone and a second speaker; and
  - a second chamber comprising a second microphone and a first speaker;

wherein the first microphone and the first speaker are in communication with a telephone device only and the second microphone and the second speaker are in communication with a VoIP device only.

According to an embodiment, the body is made of a material that provides acoustic insulation between the first chamber and the second chamber.

According to an embodiment, the first microphone and the first speaker are in connection with a first connector that connects to the telephone device only and the second microphone and the second speaker are in connection with a second connector that connects to the VoIP device only.

As will be realized, the subject matter disclosed is capable of modifications in various respects. Accordingly, the drawings and the description are to be regarded as illustrative in nature, and not as restrictive.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
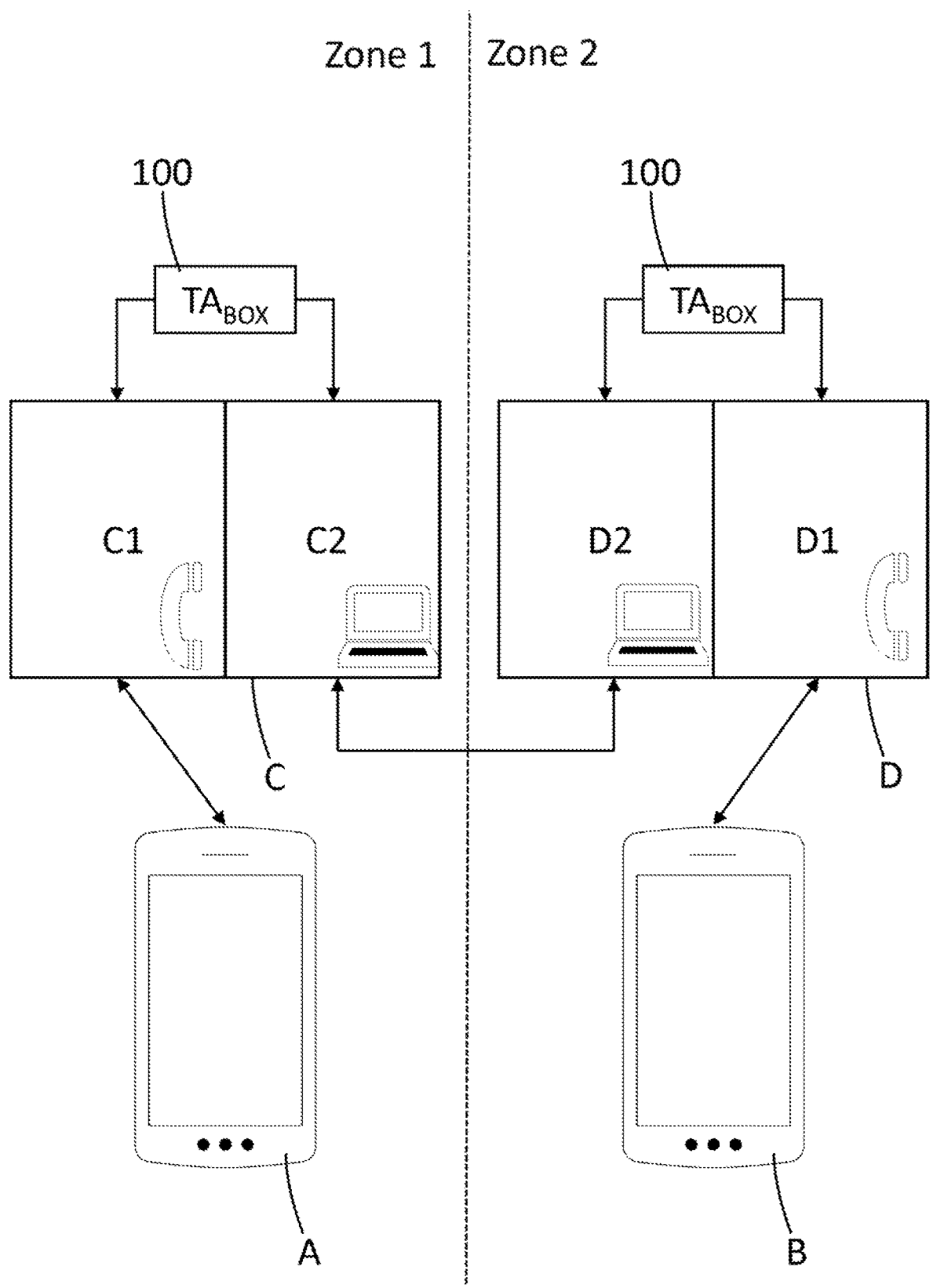
FIG. 1 is a schematic diagram illustrating a system for making phone calls between different zones, according to an embodiment.

The invention described herein allows a first user in a first telecommunication zone wishing to make a phone call to a second user in a second telecommunication zone to simply call the second user using the phone network (including landline or cellular network) without having to actually perform an international call (i.e., from the first zone to the second zone) which is usually costly.

The invention described herein further allows to make calls that are compatible even though some communication solutions are not compatible. For example, there may exist communication solution in the prior art which are not adapted to an international context, e.g., the first user may want to use Skype™ for an internet (i.e., VoIP or voice over internet protocol) call, but is prevented to do so because the second user is in a second zone where this service is prohibited by law. Indeed, some VoIP services (such as Skype™, mentioned above, Facebook™ and other applications) are not available in every country.

Moreover, for callers wishing to use VoIP calls, some of the existing solutions are not compatible with each other. There are currently many applications in addition to the phone to make calls over the internet: Skype™ Facebook™, Facetime™, WhatsApp™, Viber™, etc. They are not all compatible, which may force users to make additional installations on their smartphone or other calling device (laptop, desktop, smartwatch, etc.).

Moreover, the obligation to use a VoIP solution (e.g., Facebook) to make affordable calls (not using international telephone networks, which are costly), may be irritating in some circumstances. For example, for a user using Facebook to make an audio or video call with a smartphone, an incoming phone call can override the current Facebook call session if the operating system of the smartphone defines phone as having a priority over Facebook. The interruption is irritating and caused by the obligation to use an application (which is not the actual phone) of the smartphone to make an internet call, where the application has a lower priority than the phone according to the OS of the smartphone. It would thus be preferable to use the actual phone (e.g., of the smartphone) to make the call and avoid this cause of irritation (i.e., the possibility of an interruption by an incoming phone from another person); the use of a traditional phone call could be contemplated, but international calls to landline and mobile can be particularly costly and therefore inappropriate, especially for intercontinental calls.

The invention described herein below allows the user to use the phone line (or any other preferred method of making a call) while not having to make an international phone call. A first gateway is provided to convert the sound signal of the first caller to a VoIP call to a second gateway in the second zone. The VoIP call between the gateways uses the internet and the international nature of this call does not incur particular costs. The second gateway converts the sound signal of the received VOIP call to a phone call to the second user. Each phone call between a gateway and its respective caller is preferably within the same zone (i.e., same country) and should incur low costs or no cost at all.

Referring to FIG. 1, there is schematically shown an embodiment of a system and method for passing a call from a first telephone device (A) of a first party to a second telephone device (B) of a second party, in accordance with a preferred embodiment of the present invention. The first party is typically the caller, and the second party is typically the receiver of the call. Their roles can eventually be interchanged, and the caller can call other people, although the system and method are herein described in the context where the first party make the phone call to the second party.

A purpose of the present invention is to reduce the telephone costs as compared with making a direct telephone from the first telephone device (A) to the second telephone device (B).

As shown in FIG. 1, each one of the first party (caller) and the second party (receiver of the call) have their telephone device (respectively A and B) in communication, preferably over the telephone network (either landline or mobile) with a gateway (C, D, respectively) that is located within the same zone for telephone purposes (normally in the same country and, generally, the party A or B is remote from the gateway C or D). The system is symmetric, such that the gateways C, D are built in the same way or at least similar (e.g., specific connections are arrangement can differ but both gateways should work in the same way).

The method includes the steps of: a) establishing a first telephone call from the first telephone device (A) to a local-call device (c1) of a third party gateway (C); and b) establishing a conference call by the third party gateway (C) between the local-call device (c1) and a VoIP device (c2) of the third party gateway (C) using a first voice transmission apparatus 100 or "TABox". These first two steps a) and b) are conducted in a first zone (zone 1). Being in the same zone, from a telecommunication point of view and within the scope of the present description means within the zone not implying an international calling fee, for example in the same country or group or countries where no international fee is involved, or more strictly, within the same region to avoid long-distance calling fees.

Indeed, the third party gateway (C) comprises two devices, each in communication with an in-situ voice transmission apparatus 100 or "TABox" serving as a voice signal bridge between both devices of the same gateway.

The local-call device (c1) of a third party gateway (C) should be able to receive calls from both the telephone network (thus providing the advantage to the caller to use the phone line), or VoIP calls. The VoIP device (c2) of the third party gateway (C) is distinct from the local-call device (c1) of a third party gateway (C) and is adapted to perform strict VoIP calls with another similar device elsewhere in the world, typically in another country or zone.

For greater simplicity and low cost, the gateway performs a sound conversion. Indeed, regardless of the manner by which a call is made, the purpose of the call (phone or VoIP) is to transmit voice. Therefore, the third party gateway (C) uses the first voice transmission apparatus 100 or "TABox", illustrated in FIGS. 2A-2B, to convert the incoming call to voice, and continuously records it (in real time) into the VoIP device (c2) of the third party gateway (C) for real-time VoIP transmission to another zone of the world.

The method further includes the steps of: c) establishing a VoIP call from the VoIP device (c2) of the third party gateway (C) to a VoIP device (d2) of a fourth party gateway (D), using IP protocol and generally between different zones of the world; d) accepting the VoIP call by the fourth party gateway (D) from the VoIP device (c2) of the third party gateway (C) to the VoIP device (d2) of the fourth party gateway (D); e) establishing a conference call by the fourth party gateway (D) between the local-call device (d1) and the VoIP device (d2) of the fourth party gateway (D) using a second voice transmission apparatus 100 or "TABox", typically another TABox unit that is identical to the first one. The steps d) and e) are conducted in a second zone (zone 2).

Finally, the method includes the step of establishing a second telephone call from the local-call device (d1) of the fourth party gateway (D) to the second telephone device (B) of the second party to pass the call from (A).

The first party and the second party may be persons that have a landline or mobile telephone with a local tariff.

The third (C) and fourth (D) parties may comprise an arrangement of telephone devices (c1, d1) with a landline or mobile telephone with a local tariff; an intelligent telephone, tablet or computer with VOIP software; and a voice transmission apparatus (TABox).

The first step (step 1) establishes a call solution from a landline or mobile telephone to a VoIP apparatus. The second step (step 2) establishes a call solution from a landline or mobile telephone to a similar landline or mobile telephone.

Figure 2A:
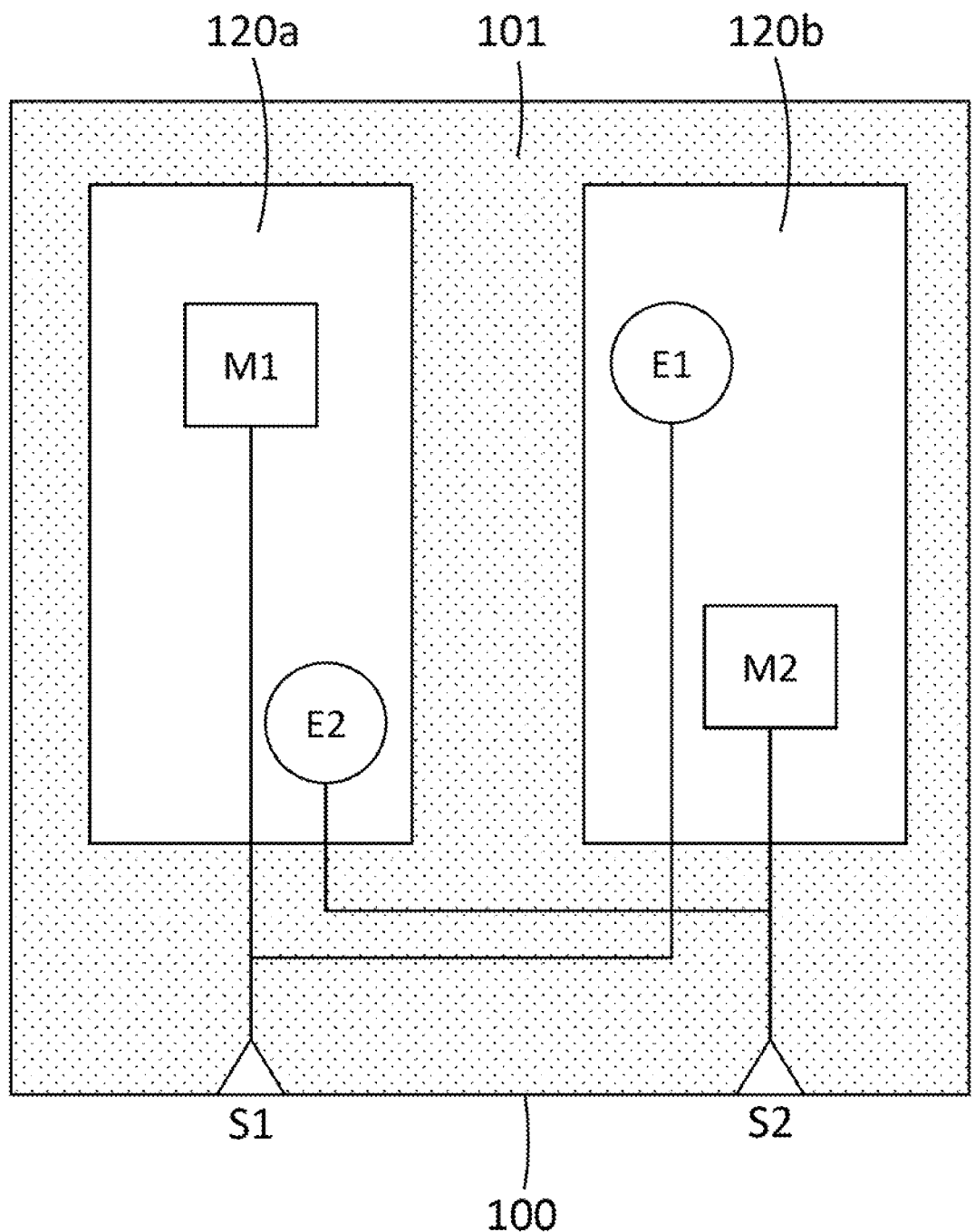
FIG. 2A is a schematic diagram illustrating a voice transmission apparatus (TABox), according to an embodiment.
Figure 2B:
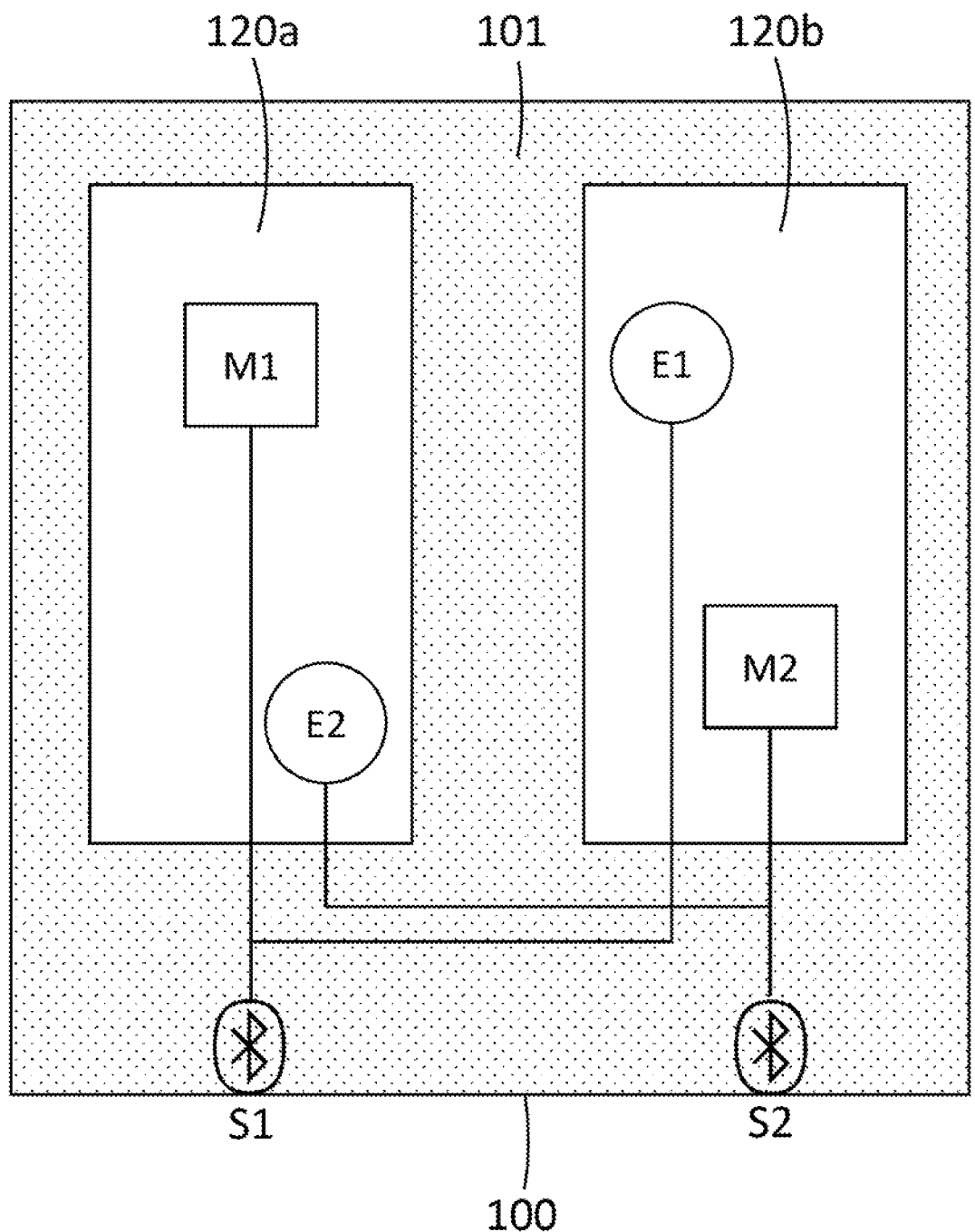
FIG. 2B is a schematic diagram illustrating a voice transmission apparatus (TABox), according to another embodiment.

Referring to FIGS. 2A-2B, there is schematically shown an embodiment of a voice transmission apparatus (TABox), in accordance with an illustrative embodiment of the present invention. The apparatus (TABox) includes a housing, connectors S1, S2, which can be jack or other wired connectors (FIG. 2A) or Bluetooth™ or other wireless connectors (FIG. 2B), a first chamber 120a with a first microphone (M1) and speaker (E2) and a second chamber 120b with a second microphone (M2) and speaker (E1). An acoustic insulation material forms the body 101 that separates the two chambers from each other and from the outside and ensures that each microphone can record its dedicated speaker with great sound quality before transmitting it to the local-call device (d1) of the second party gateway (D) or to the VoIP device (c2) of the third party gateway (C).

The voice transmission apparatus 100 or "TABox" is a transmitter and receiver of voice between "c1, d1" (telephone or fixed device) and "c2, d2" (device with VoIP software). S1 is a jack input connector or Bluetooth connector to E1 (speaker) and M1 (microphone) with headphone cable. S2 is a jack input connector or Bluetooth connector to E2 (speaker) and M2 (microphone) with headphone cable. As mentioned above, the voice transmission apparatus 100 can have connectors that are wired (FIG. 2A) or wireless (FIG. 2B), and may be hybrid are have booth options.

The first chamber 120a is a sound-insulating hollow box, which collects sound from the c2 device to c1 device, when used with the third party gateway (C). The second chamber 120b is also a sound-insulating box, which collects sound from the c1 device to c2 device, when used with the third party gateway (C). The housing is a box or enclosure having a body 101 with a material that acoustically insulate the chambers 120a, 120b and the outside.

There are two chambers 120a, 120b to allow individual and distinct treatment of the voice signals received from both the caller and the receiver.

By taking advantage of the simplicity of sound conversion, the voice transmission apparatus 100 or "TABox" can provide simple and low-cost conversion capabilities to a gateway (C, D). The gateway (C, D) can therefore "translate" a call received locally (over the telephone network or IP protocol) to a VoIP device of the gateway that communicate symmetrically with another gateway in a distinct and remote zone. That other gateway (D) can thus make the reverse operation of sound conversion to "translate" the voice to the type of signal that is locally needed in this distinct and remote zone, such as a local phone call or a local VoIP call if needed.

Each user is therefore free to use their preferred method of calling, such as the phone. Using the phone (i.e., the "traditional" phone over a landline or mobile phone network) on a smartphone instead of a VoIP application can be advantageous to avoid interruption by incoming phone calls, as mentioned above.

Moreover, it ensures that a caller can use their preferred VoIP applications without having to worry about the compatibility for the receiver of the call, or worrying if the same application is available and this other country. The only requirement is that the gateway (C) in the same zone is able compatible with such an application.

Normally, the gateway should be able to receive local phone calls, thus enabling the simplest method of communication through the telephone network, as initially contemplated.

The VoIP device of each gateway (C, D) needs to have an internet connection in order to perform the VoIP call between them. For example, each VoIP device can be a computer (laptop, desktop, etc.), a tablet, a server, a smartphone, etc., as long it comprises an internet connection as VoIP calls are enabled.

The local-call device and the VoIP device of a given gateway (C, D) should have connectors that match those of the voice transmission apparatus 100 or "TABox" being used in combination with such gateway (C, D).

Figure 3A:
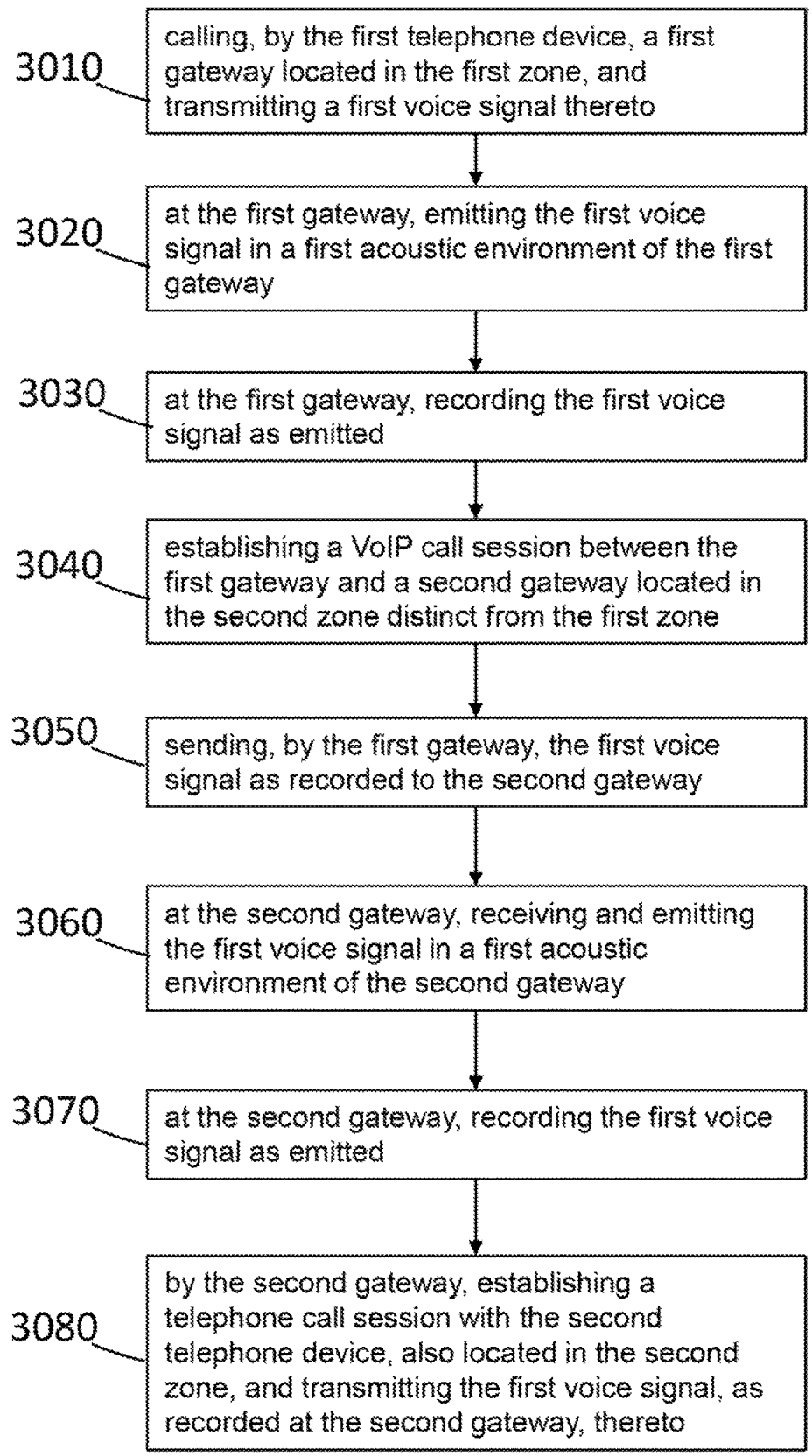
FIGS. 3A-3B are a flowchart illustrating a method for making phone calls between different zones, according to an embodiment.
Figure 3B:
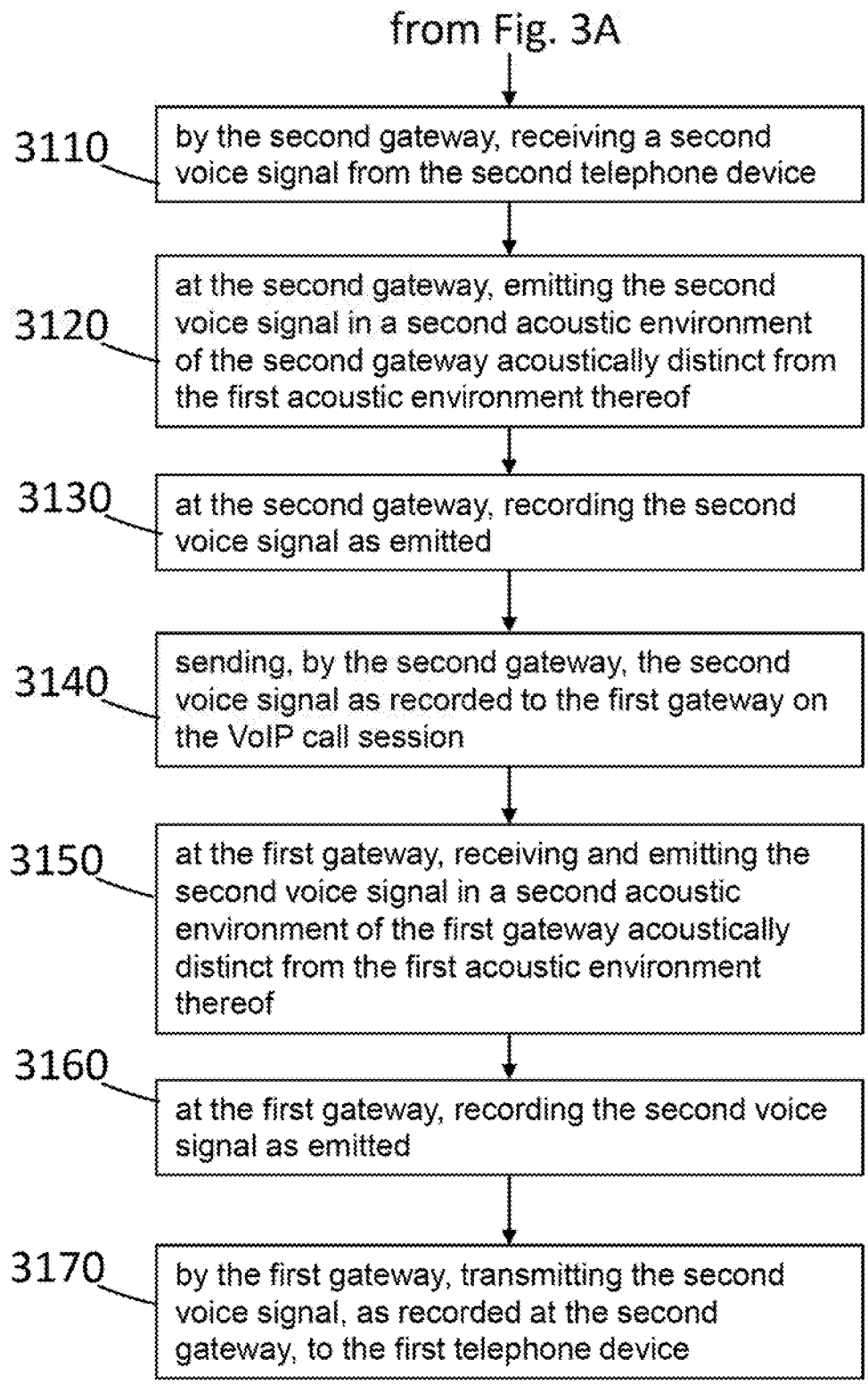

FIGS. 3A-3B is a flowchart illustrating steps that are taken to perform the method:

Step 3010: calling, by the first telephone device, a first gateway located in the first zone, and transmitting a first voice signal thereto;

Step 3020: at the first gateway, emitting the first voice signal in a first acoustic environment of the first gateway;

Step 3030: at the first gateway, recording the first voice signal as emitted (where the term "recording" used throughout the present description is intended to mean collecting the voice signal for converting it to an electromagnetic signal or the like, like in a microphone, and should not be viewed as a synonym for "saving", although saving may be optionally performed in addition to the described step of "recording");

Step 3040: establishing a VoIP call session between the first gateway and a second gateway located in the second zone distinct from the first zone;

Step 3050: sending, by the first gateway, the first voice signal as recorded to the second gateway;

Step 3060: at the second gateway, receiving and emitting the first voice signal in a first acoustic environment of the second gateway;

Step 3070: at the second gateway, recording the first voice signal as emitted; and Step 3080: by the second gateway, establishing a telephone call session with the second telephone device, also located in the second zone, and transmitting the first voice signal, as recorded at the second gateway, thereto.

Since the overall call session should be bidirectional (both people talking, either alternately or simultaneously, hence the dual acoustic chambers in a single gateway to separate incoming and outgoing sound signals), the following steps will usually take place in practice, in reference with FIG. 3B (in continuation with FIG. 3A):

Step 3110: by the second gateway, receiving a second voice signal from the second telephone device;

Step 3120: at the second gateway, emitting the second voice signal in a second acoustic environment of the second gateway acoustically distinct from the first acoustic environment thereof;

Step 3130: at the second gateway, recording the second voice signal as emitted;

Step 3140: sending, by the second gateway, the second voice signal as recorded to the first gateway on the VoIP call session;

Step 3150: at the first gateway, receiving and emitting the second voice signal in a second acoustic environment of the first gateway acoustically distinct from the first acoustic environment thereof;

Step 3160: at the first gateway, recording the second voice signal as emitted;

Step 3170: by the first gateway, transmitting the second voice signal, as recorded at the second gateway, to the first telephone device.

The steps of:

emitting the first voice signal in a first acoustic environment of the first gateway; and emitting the first voice signal in a first acoustic environment of the second gateway;

emitting the second voice signal in a second acoustic environment of the second gateway;

emitting the second voice signal in a second acoustic environment of the first gateway;

are each performed by a respective speaker dedicated to this step. A respective microphone should also be included within the same chamber 120a, 120b forming the first acoustic environment and the second acoustic environment of any TABox.

While preferred embodiments have been described above and illustrated in the accompanying drawings, it will be evident to those skilled in the art that modifications may be made to provide possible variants.

The invention claimed is:

1. A method for making a call between a first telephone device and a second telephone device located in different telecommunication zones, namely a first zone and a second zone respectively, the method comprising:

calling, by the first telephone device, a first gateway located in the first zone, and transmitting a first voice signal thereto;

at the first gateway, emitting the first voice signal in a first acoustic environment of the first gateway;

at the first gateway, recording the first voice signal as emitted;

establishing a VoIP call session between the first gateway and a second gateway located in the second zone distinct from the first zone;

sending, by the first gateway, the first voice signal as recorded to the second gateway;

at the second gateway, receiving and emitting the first voice signal in a first acoustic environment of the second gateway;

at the second gateway, recording the first voice signal as emitted; and by the second gateway, establishing a telephone call session with the second telephone device, also located in the second zone, and transmitting the first voice signal, as recorded at the second gateway, thereto.

2. The method of claim 1, wherein the steps of:

emitting the first voice signal in a first acoustic environment of the first gateway; and emitting the first voice signal in a first acoustic environment of the second gateway;

are each performed by a respective speaker dedicated to this step.

3. The method of claim 1, wherein each respective speaker has a corresponding microphone for recording the first voice signal as emitted by each respective speaker.

4. The method of claim 1, further comprising:

by the second gateway, receiving a second voice signal from the second telephone device;

at the second gateway, emitting the second voice signal in a second acoustic environment of the second gateway acoustically distinct from the first acoustic environment thereof;

at the second gateway, recording the second voice signal as emitted;

sending, by the second gateway, the second voice signal as recorded to the first gateway on the VoIP call session;

at the first gateway, receiving and emitting the second voice signal in a second acoustic environment of the first gateway acoustically distinct from the first acoustic environment thereof;

at the first gateway, recording the second voice signal as emitted; and by the first gateway, transmitting the second voice signal, as recorded at the second gateway, to the first telephone device.

5. The method of claim 4, wherein the steps of:

emitting the first voice signal in a first acoustic environment of the first gateway; and emitting the first voice signal in a first acoustic environment of the second gateway;

emitting the second voice signal in a second acoustic environment of the second gateway;

emitting the second voice signal in a second acoustic environment of the first gateway;

are each performed by a respective speaker dedicated to this step.

6. The method of claim 5, wherein each respective speaker has a corresponding microphone for recording the first voice signal as emitted by each respective speaker.

7. The method of claim 1, wherein calling, by the first telephone device, a first gateway located in the first zone comprises calling over a telephone network only within the first zone.

8. The method of claim 7, wherein establishing a telephone call session with the second telephone device, by the second gateway, comprises calling over a telephone network only within the second zone.

9. A gateway system comprising:

a local-call device for receiving and sending phone call signals from and to a telephone device located in a same telecommunication zone;

a VoIP device, distinct from the local-call device, for receiving and sending VoIP call signals from and to a remote and distinct VoIP device located in another distinct telecommunication zone;

a voice transmission apparatus comprises a set of two acoustically distinct chambers comprising:

a first chamber comprising a first microphone and a second speaker; and a second chamber comprising a second microphone and a first speaker;

wherein the first microphone and the first speaker are in communication with the local-call device only and the second microphone and the second speaker are in communication with the VoIP device of the gateway system only.

10. The gateway system of claim 9, wherein the first microphone and the first speaker are in connection with a first connector that connects to the local-call device only and the second microphone and the second speaker are in connection with a second connector that connects to the VoIP device of the gateway system only.

11. The gateway system of claim 10, wherein the first connector and the second connector comprise a jack connector.

12. The gateway system of claim 10, wherein the first connector and the second connector comprise a Bluetooth™ connector.

13. The gateway system of claim 9, wherein the local-call device is a telephone.

14. The gateway system of claim 13, wherein the local-call device is for receiving and sending phone call signals over a telephone network.

15. The gateway system of claim 13, wherein the local-call device is for receiving and sending phone call signals over internet.

16. The gateway system of claim 9, wherein the voice transmission apparatus comprises a body that defined the set of two acoustically distinct chambers, the body being made of a material that provides acoustic insulation.

17. The gateway system of claim 9, wherein the remote and distinct VoIP device located in another distinct telecommunication zone belongs to another gateway system thus forming a pair of gateway systems performing a VoIP gateway being telecommunication zones.

18. A voice transmission apparatus comprising:

a body defining a set of two acoustically distinct chambers comprising:

a first chamber comprising a first microphone and a second speaker; and a second chamber comprising a second microphone and a first speaker;

wherein the first microphone and the first speaker are in communication with a telephone device only and the second microphone and the second speaker are in communication with a VoIP device only.

19. The voice transmission apparatus of claim 18, wherein the body is made of a material that provides acoustic insulation between the first chamber and the second chamber.

20. The voice transmission apparatus of claim 18, wherein the first microphone and the first speaker are in connection with a first connector that connects to the telephone device only and the second microphone and the second speaker are in connection with a second connector that connects to the VoIP device only.

* * * * *